United States Patent [19]

Day

[11] Patent Number: 4,612,158

[45] Date of Patent: Sep. 16, 1986

[54] PROCESS FOR CONTROLLING LEAKS BETWEEN THE PRIMARY AND SECONDARY COOLANT LOOPS OF A PRESSURIZED WATER REACTOR SYSTEM

[75] Inventor: Bobby L. Day, Waldesch, Fed. Rep. of Germany

[73] Assignee: Brown Boveri Reaktor GmbH, Fed. Rep. of Germany

[21] Appl. No.: 562,560

[22] Filed: Dec. 19, 1983

[30] Foreign Application Priority Data

Dec. 24, 1982 [DE] Fed. Rep. of Germany ....... 3248029

[51] Int. Cl.$^4$ ............................................. G21C 17/00
[52] U.S. Cl. .................................... 376/250; 376/402; 165/104.32
[58] Field of Search ............... 376/250, 277, 282, 283, 376/307, 310, 316, 402; 137/15; 122/32, 33, 504, 504.2; 165/11, 70, 134 R, 104.32

[56] References Cited

U.S. PATENT DOCUMENTS

| | | | |
|---|---|---|---|
| 2,948,516 | 8/1960 | Martinelli et al. | 165/104.32 |
| 3,214,197 | 10/1965 | Gruber | 137/15 |
| 3,245,463 | 4/1966 | Benedict et al. | 165/104.32 |
| 3,258,403 | 6/1966 | Malay | 376/250 |
| 3,722,578 | 3/1973 | Frei et al. | 165/104.32 |
| 3,933,580 | 1/1976 | Aleite et al. | 376/211 |
| 3,963,564 | 6/1976 | Lecocq | 376/310 |
| 4,104,117 | 8/1978 | Parziale et al. | 376/402 |
| 4,124,067 | 11/1978 | Bonnet et al. | 165/104.32 |
| 4,165,615 | 8/1979 | Morcov | 376/402 |
| 4,187,146 | 2/1980 | Shen et al. | 376/310 |
| 4,216,821 | 8/1980 | Robin | 376/405 |
| 4,278,500 | 7/1981 | Ailloud et al. | 376/241 |
| 4,365,664 | 12/1982 | Basiulis | 165/40 |

FOREIGN PATENT DOCUMENTS

| | | | |
|---|---|---|---|
| 2431753 | 2/1980 | France | 376/211 |
| 0122090 | 10/1978 | Japan | 376/307 |
| 0951896 | 3/1964 | United Kingdom | 376/307 |

OTHER PUBLICATIONS

Davis, Westinghouse Engineer, 11/60, pp. 162-165.

Primary Examiner—David H. Brown
Assistant Examiner—Richard W. Wendtland
Attorney, Agent, or Firm—Robert J. Edwards; James C. Simmons; D. Neil LaHaye

[57] ABSTRACT

To control leaks between the primary and secondary circuits of a pressurized water reactor system, a pressure equalization is brought about by shutting off the live steam line and the feedwater line connected to the secondary circuit of the steam generator and by increasing the pressure prevailing in the resulting isolated secondary circuit by the injection of gas.

1 Claim, 1 Drawing Figure

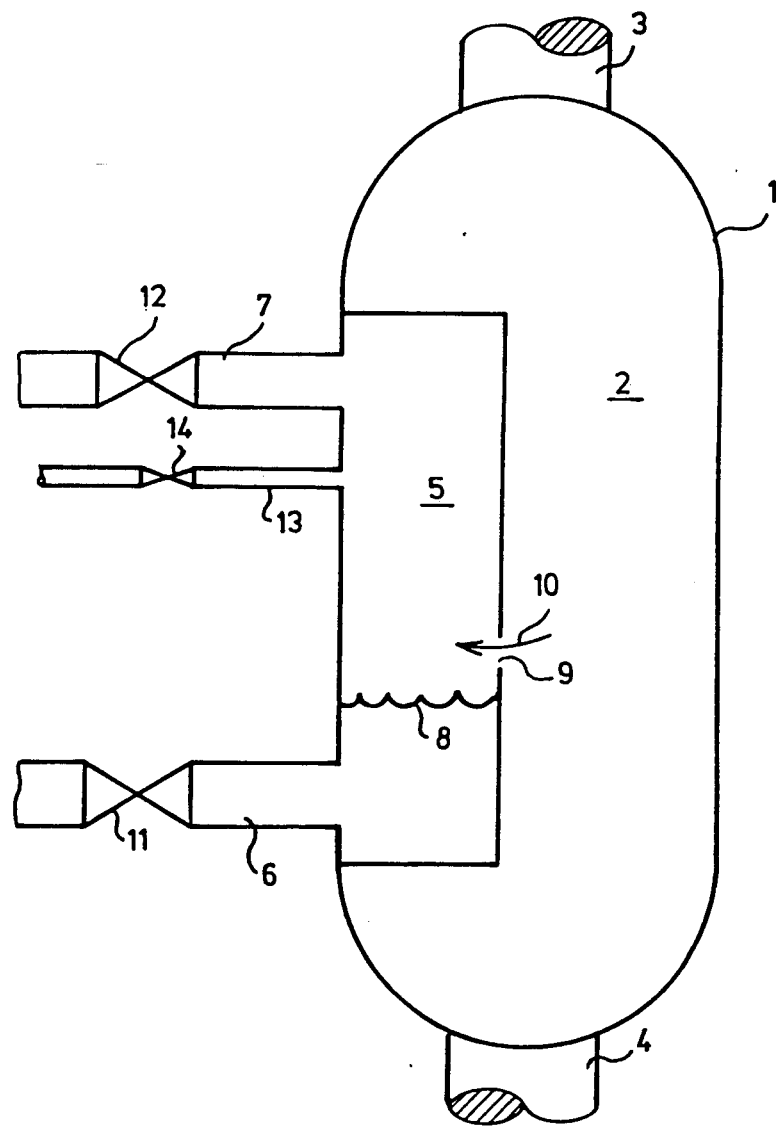

PROCESS FOR CONTROLLING LEAKS BETWEEN THE PRIMARY AND SECONDARY COOLANT LOOPS OF A PRESSURIZED WATER REACTOR SYSTEM

This invention concerns a process for controlling leaks which occur inside a steam generator of a pressurized water reactor system having more than one steam generator between the primary and seocndary loops, by changing the pressure differential between the primary coolant and the secondary area located inside the leaking steam generator.

During the shutdown of a nuclear power plant with a pressurized water reactor, as long as the heat removal from the primary coolant circuit occurs through an operative steam generator, saturation pressure corresponding to the temperature of the secondary water supply in the steam generator prevails in the secondary loop of the steam generator. The coolant on the primary side of the steam generator has a slightly higher temperature and is kept undercooled by connection to a pressurizer with a substantially higher pressure than the saturation pressure of the primary coolant. From these conditions, it necessarily results that the pressure on the primary side in the steam generator will be higher than the pressure on the secondary side.

After the occurence of a heat-transfer tube leak, radioactive primary coolant therefore flows into the secondary side of the leaking steam generator and represents the hazard of a liberation of radioactivity as well as flooding of the steam generator.

In the traditional methods for controlling these incidents, the leak is reduced during the shutdown of the system by reducing the pressure differential between the primary coolant and the secondary side of the leaking steam generator. A complete pressure equalization (leakage=zero) is possible by foregoing an undercooling of the primary coolant and thus production of saturation conditions in the primary coolant loop. This condition is permissible under some circumstances, but is highly undesirable since it makes it difficult to guarantee the cooling of the core.

It is therefore the purpose of this invention for the control of a leak of the type mentioned to bring about a pressure equalization between the primary coolant circuit and the seocndary area of a leaking steam generator in which a pressure margin (referred to herein as subcooling margin) is maintained between the actual and saturation condition of the primary coolant whereby the primary coolant is sub-cooled.

In order to solve this problem in accordance with the present invention, the live steam line and the feedwater line connected to the secondary area are blocked, and the pressure prevailing in the secondary area of the leaking steam generator is increased by injecting gas.

A pressure equalization is produced by this method, without the loss of the sub-cooling margin from saturation of the primary coolant.

A particular refinement of the process provides that the pressure prevailing in the secondary area is brought to a value below the permissible steam generator pressure by the injection of gas, and that the primary coolant pressure is lowered to the pressure then present in the secondary circuit.

Thus, even in steam generators with a limited permissible pressure, the sub-cooling margin from saturation of the primary coolant may be maintained.

The various features of novelty which characterize the invention are pointed out with particularlity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

IN THE DRAWINGS

The single FIGURE is a schematic view of a steam generator.

In the sngle illustration, a steam generator 1 of a pressurized water reactor system having more than one steam generator, not illustrated, is shown schematically. Primary coolant flows through a tube bundle symbolized by the space 2. It is introduced through a line 3 from a reactor pressure vessel, and is fed back to it through a line 4. The secondary circuit of the steam generator is symbolized by the space 5. The water introduced through the feedwater line 6 flows around the tube bundle conducting the primary coolant and leaves the steam generator 1 as steam through the live steam line 7. The change of the feedwater from the liquid into the vaporized state is indicated by the line 8.

If a tube in the tube bundle conducting the primary coolant should break, then radioactive primary coolant may reach the secondary circuit of the leaking steam generator, since the pressure of the primary coolant is always higher than the pressure in the secondary circuit. The point of the break is illustrated by the opening 9, through which the primary coolant reaches the secondary circuit in the direction of the arrow 10. The shutoff valves 11 and 12 positioned in the feedwater and live steam lines are then closed. Of course, it should also be assured that other auxiliary lines such as blowdown lines, recirculation lines, and drainlines are suitably isolated. Nitrogen gas is injected into the secondary circuit through a line 13 connected to the leaking steam generator and to a source of gas, not illustrated, after the opening of the shutoff valve 14, until the same pressure prevails there as in the primary loop. The pressure present in the secondary circuit is composed of the live steam pressure and the partial pressure of the injected nitrogen gas. A sub-cooling margin from saturation pressure can be then be maintained in the primary coolant which corresponds to the partial pressure of the injected nitrogen gas. This is very important since an adequate sub-cooling margin from saturation pressure allows the reactor system to be shut down safely by removal of decay heat through the other operative steam generators. For the purposes of this specification and the claims, the term "gas" is not limited to nitrogen gas but is meant to include other suitable gaseous substances such as, for example, steam at a pressure above the saturation pressure of the water in the secondary circuit in those steam generators where such use of steam is suitable such as those of the U-tube type.

If the secondary circuit of the steam generator, for example, is limited to a permissible pressure by a safety valve, then after closing the shutoff valves 11 and 12, only so much gas is injected through the line 13 so that the total pressure formed by the partial pressures of live steam and gas lies below the permissible pressure. The primary coolant pressure is then brought down to this total pressure of the secondary circuit, so that a pressure equalization also occurs. Here also, the partial pressure of gas represents a measure of the sub-cooling margin of the primary coolant from the saturation pressure. It may actually be smaller than in the previously described exaple, but is adequate to allow a safe shutdown of the reactor system by removal of decay heat through the other operative steam generators.

Certain features of this invention may sometimes be used to advantage without a corresponding use of the other features. While a specific embodiment of the invention has been shown and described in detail to illustrate the application of the principles of the invention, it will be understood that the invention may be embodied otherwise without departing from such principles.

I claim:

1. Process for controlling leaks between the primary and secondary coolant circuits inside a steam generator, having a live steam line and a feedwater line connected to the secondary circuit, of a pressurized water reactor system having at least two steam generators, the process comprises shutting off the live steam line and feedwater line connected to the leaking secondary circuit, and injecting gas to increase the pressure in the secondary circuit of the steam generator above the saturation pressure of water for the temperature present in the steam generator, permitting a pressure equalization between the primary and secondary circuits with the maintenance of subcooled conditions in the primary circuit.

* * * * *